Nov. 18, 1958     G. A. SMITH     2,860,405

METHOD OF MANUFACTURING TRANSFORMER CORES

Filed May 14, 1956     2 Sheets-Sheet 1

INVENTOR
GEORGE A. SMITH
BY Weatherford & Weatherford
attys

Nov. 18, 1958          G. A. SMITH          2,860,405

METHOD OF MANUFACTURING TRANSFORMER CORES

Filed May 14, 1956          2 Sheets-Sheet 2

INVENTOR
GEORGE A. SMITH

United States Patent Office 2,860,405
Patented Nov. 18, 1958

2,860,405

METHOD OF MANUFACTURING TRANSFORMER CORES

George A. Smith, Pine Bluff, Ark., assignor to Central Transformer Corporation, Pine Bluff, Ark., a corporation of Arkansas Original application July 5, 1955, Serial No. 519,965. Divided and this application May 14, 1956, Serial No. 584,575

5 Claims. (Cl. 29—155.57)

This invention relates to a method for manufacturing transformer cores.

This application is a division of my copending application Serial No. 519,965, filed July 5, 1955.

In particular this invention relates to the method used and product obtained in the manufacture of so-called wound-type magnetic cores using magnetic rolled metal strip of suitable composition, wherein the lamination layers of the cores are annealed, cut, and then subsequently linked with a pre-formed electrical winding or windings of a transformer.

Heretofore in the manufacture of such cores after the core has been linked with said windings the ends of the lamination layers of the cores have been joined in various ways. In one method of manufacture the individual lamination layers have been joined by butting the ends of said layers to form a so-called butt joint, wherein the joints are in alinement. This method of joining results in high core losses since the joints cause a gap in the magnetic circuit. Another method of joining has been to overlap the ends of the layers to form a so-called lap joint core. This method results in a build-up in the cross sectional area of the core at the joints since the overlapping of the layers produces a section which has substantially twice as many lamination layers as the other sections of the core. In addition to providing a core which is undesirably bulky in the area of the lap joints, in this type of core more material is required than for the butt joint type since extra material must be provided to form the overlapping portions.

Therefore, this invention is directed to a novel method and product thereof which overcomes the above mentioned disadvantages and objections in magnetic cores and their manufacture. These disadvantages are overcome by providing in the present invention a novel method for joining the lamination layers of the magnetic cores of transformers, which produces a product uniform in cross sectional area throughout, which is economical to manufacture and which has excellent magnetic properties.

The principal object of the present invention is to provide a new and improved method of manufacturing transformer cores.

A further object of the invention is to provide a method of manufacturing cores for transformers which includes the steps of forming a trapezoidal coil of magnetic strip material having a major short side and a shorter minor short side, forming a trapezoidal coil of magnetic strip material having a major short side, substantially equal in length to the first mentioned minor short side and a shorter minor short side, annealing said trapezoidal coils, subsequently severing the first mentioned coil across its major short side and the last mentioned coil across its minor short side, and thereafter overlapping ends of lamination layers from the first mentioned coil as severed and interleaving lamination layers from the last mentioned coil as severed between the successive lapped layers.

A further object of the invention is to generally improve the construction and method of manufacture of transformer cores.

The means by which the foregoing and other objects of the present invention are accomplished and the manner of their accomplishment will be readily understood from the following specification upon reference to the accompanying drawings, in which.

Figure 1:
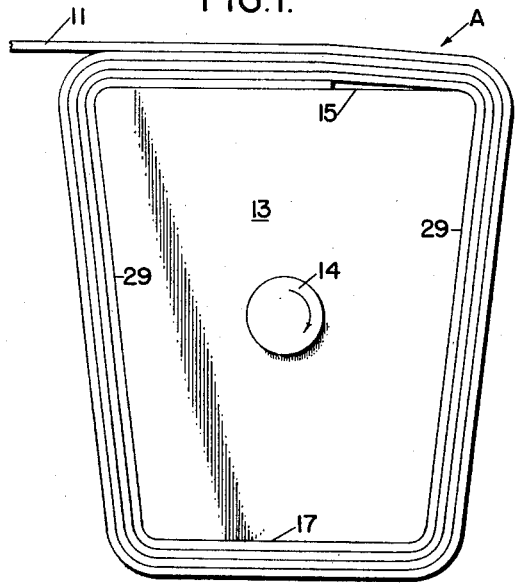
Fig. 1 is an elevational view of one of a pair of mandrels used in the manufacture of the magnetic cores showing the magnetic metal strip being wound thereon.

Referring now to the drawings in which the various parts are indicated by numerals, the construction of the transformer core of the present invention is begun by winding a magnetic metal strip 11, having a suitable width and thickness, onto a preferably trapezoidal-shaped mandrel 13. The magnetic strip is preferably of the type which has a most favorable magnetic direction which is along the length of strip, such as cold rolled steel strip. Mandrel 13 is adapted to be mounted on a shaft 14 of a winding lathe (not shown). Fig. 1 illustrates the winding process with the mandrel illustrated as being rotated in a clockwise direction, although it is obvious that the winding may be performed with the mandrel being rotated in either direction. The longer side 15 of the two unequal sides of mandrel 13 is of a length which is equal to the length of the shorter side 17 of said unequal sides plus any given length. For clarity, said given length will be denoted X and the length of shorter side 17 will be denoted Y. Thus longer side 15 is equal to X plus Y.

The winding of magnetic strip 11 onto mandrel 13 is continued until the desired number of turns have been wound on said mandrel. The strip 11 is then severed from the supply reel leaving the winding A, comprising a plurality of lamination layers, formed around mandrel 13. The term "lamination layers" is used herein to refer to the individual layers since one or more laminations of magnetic strip material may be included in each of the said layers. Winding A is removed from the mandrel and banded with suitable banding straps 19, as preferably of steel, which are preferably wrapped around the equal length legs of the winding A to hold the turns firmly in place. Additionally a strap 21, as preferably of steel, is fastened so as to encircle the two legs of equal length of winding A to hold said legs inwardly, thereby substantially maintaining the shape of the winding as formed on the mandrel.

Figure 2:
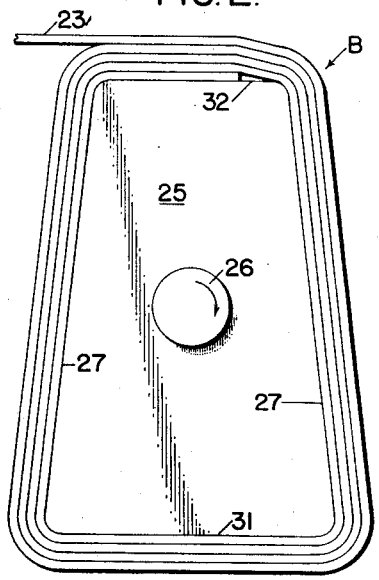
Fig. 2 is an elevational view of the other of a pair of mandrels similarly showing magnetic metal strip being wound thereon.
Figure 3:
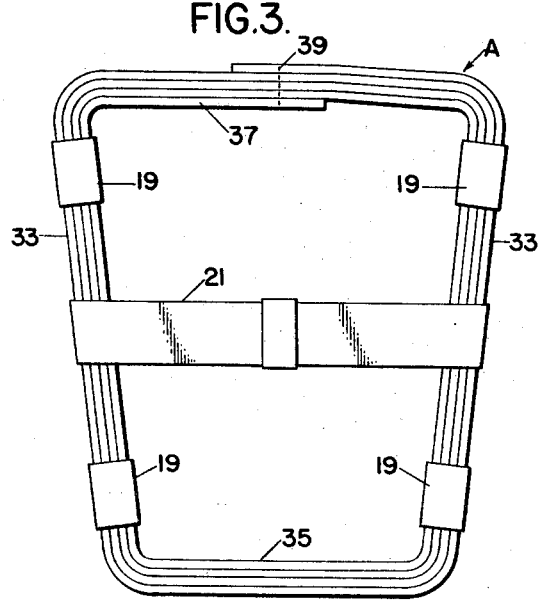
Fig. 3 is an elevational view of the core winding wound on the mandrel of Fig. 1, in the process of manufacture.
Figure 4:
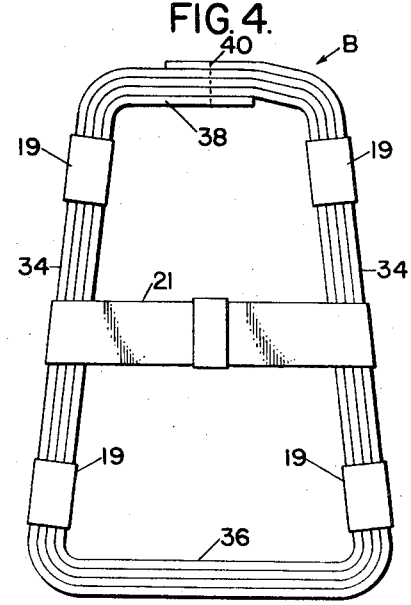
Fig. 4 is an elevational view of the core winding wound on the mandrel of Fig. 2, in the process of manufacture.

Similarly, a second winding B is formed by winding magnetic metal strip 23, preferably having the same width, thickness and composition as strip 11, onto a second trapezoidal-shaped mandrel 25, which is adapted to be mounted on a shaft 26 of a winding lathe (not shown). Fig. 2 illustrates the winding process with the mandrel illustrated as being rotated in a clockwise direction, although it is obvious that the winding may be performed with the mandrel being rotated in either direction. The two equal length sides 27 of mandrel 25 are substantially the same length as the two equal length sides 29 of mandrel 13, and the longer side 31 of the two unequal sides of mandrel 25 is substantially equal to the shorter side 17 of the two unequal sides of mandrel 13. Thus, since as heretofore described, side 17 is equal to length Y and since side 31 is equal to side 17, it follows that side 31 is equal to length Y. The shorter side 32 of the unequal sides of mandrel 25 is of a length which is equal to longer side 31 minus said given length X. Thus side 32 is equal to Y minus X.

The winding of magnetic strip 23 onto mandrel 25 is continued until the desired number of turns have been wound on said mandrel. The strip 23 is then severed from the supply reel leaving the winding B, comprising a plurality of lamination layers, formed around mandrel 25. It will be apparent that it is preferable to wind substantially the same number of turns on mandrel 25 as mandrel 13 since the lamination layers from these two mandrels will subsequently be combined, as will be hereinafter described, to form a core or cores comprising substantially fifty percent of the lamination layers of winding A and fifty percent of the lamination layers of winding B. Winding B is removed from the mandrel and in a manner similar to winding A is banded with banding straps 19 and strap 21, thereby substantially maintaining the shape of the winding as formed on the mandrel.

It will be understood that the trapezoidal windings A and B have the same relative dimensions as mandrels 13 and 25, respectively. Thus the equal legs 33 of winding A are the same length as the equal legs 34 of winding B. The shorter leg 35 of the unequal legs of winding A is the same length as the longer leg 36 of the unequal legs of winding B. The longer leg 37 of the unequal legs of winding A exceeds the shorter leg 35 by the same amount that the longer leg 36 of winding B exceeds the shorter leg 38. In other words, the length of leg 37 equals the length of leg 35 plus X and the length of leg 36 equals the length of leg 38 plus X.

Windings A and B, as bound, are then annealed in an oven having an inert atmosphere to relieve the stresses in the strip which were formed during the winding operation, thereby improving the magnetic properties of the strip. Additionally the annealing sets the shape of the windings substantially as bound.

Figure 5:
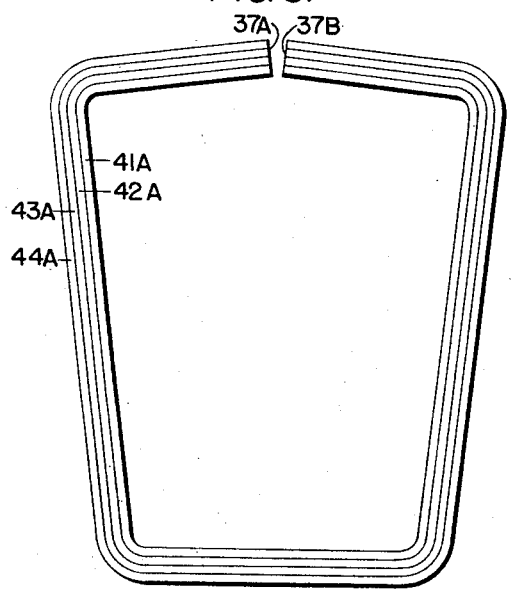
Fig. 5 is an elevational view of the core winding of Fig. 3 after the lamination layers have been severed.
Figure 6:
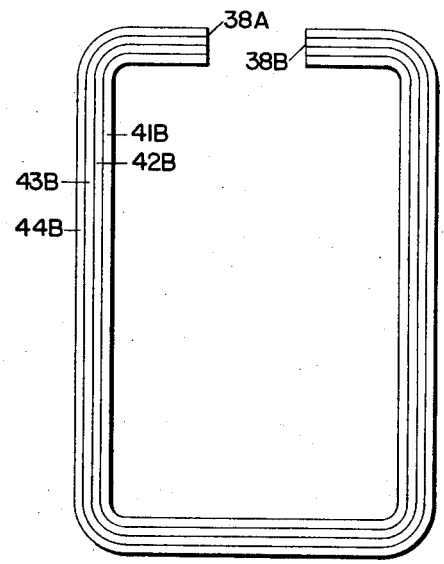
Fig. 6 is an elevational view of the core winding of Fig. 4 after the lamination layers have been severed and the stacked layers have been shaped.

The turns of windings A and B are then respectively cut through on a plane perpendicular to and substantially at the mid-section of the longer leg 37 of the two unequal legs of winding A and on a plane substantially at the mid section of the shorter leg 38 of the two unequal legs of winding B, thereby dividing the legs 37, 38 into substantially equal length and portions 37A, 37B and 38A, 38B, respectively, and forming individual discontinuous lamination layers. The cuts through these midsections of the legs 37, 38 of the windings A and B are indicated at 39, 40, respectively. The cutting may be performed by any suitable means, as for example by sawing or by severing the turns with a cutting wheel or the like. The lamination layers of winding B are then spread to substantially rectangular shape with legs 34 of the winding substantially at right angles to uninterrupted leg 36 and with the divided end portions 38A, 38B projecting substantially at right angles from the opposite ends of the respective legs. Subsequent to the cutting operation and spreading operation of winding B, the straps 19, 21 are removed from winding A and B. Fig. 5 and Fig. 6 show the stacks of layers formed from windings A and B, respectively, after this step in the process of manufacture.

For convenience the lamination layers of the respective windings are numbered consecutively, beginning with the inner layers, and have as a suffix the letter A or B to designate the windings A or B. Thus, referring to Fig. 5, the inner lamination layer of winding A is designated 41A and the successive outward lamination layers designated 42A, 43A and 44A. Referring to Fig. 6, the inner lamination layer of winding B is designated 41B and the successive outward lamination layers designated 42B, 43B and 44B. It will be understood that only four layers of each winding have been shown for purposes of illustration and that any number of layers may be included in the windings, depending upon the desired cross-sectional area of the finished core.

The lamination layers of windings A and B are then assembled with a transformer coil 45 in the following manner. The first step in this assembly operation is to separate layer 41B from winding B and to link this layer with coil 45. This linking is accomplished by spreading the severed ends of layer 41B and inserting one of said ends through the hollow central or window portion 46 of coil 45 and the other of said ends around the outside of the coil in a manner similar to that illustrated in Fig. 7 which shows layer 44B being so linked. It should be noted that in separating the ends of the turns during the process of linking with coil 45, the amount of separation is small enough so that the elastic limit of the annealed turns is not reached, thereby not impairing the magnetic properties of the strip material. For convenience the ends of the layers which are inserted through the central portion 46 will hereinafter be designated inner ends and the ends which encircle the outer periphery of the coil will be designated outer ends.

Figure 7:
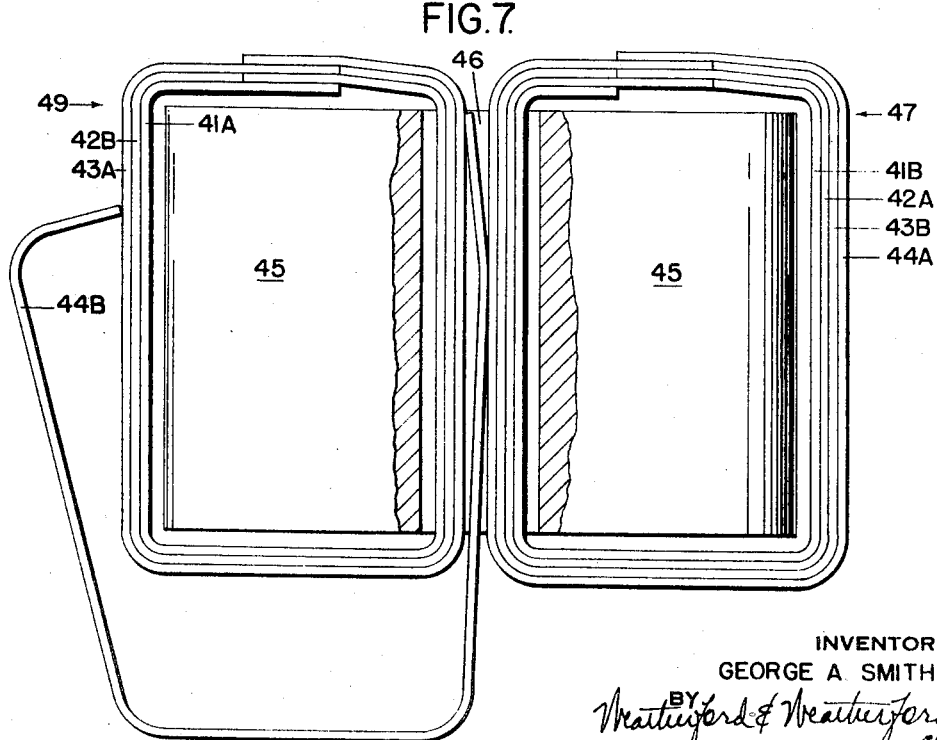
Fig. 7 is an elevational view of a transformer coil with one core linked therewith and the other core in the course of linking, certain parts being broken away for purposes of illustration.

The inner layer 41A of winding A is then linked in a similar manner to the opposite side of coil 45 and the ends of the layer 41A are overlapped by said given length X, as shown in Fig. 7, the inner end of the layer being lapped on top of the outer end of the layer. The next layer 42A of winding A is then linked on coil 45 over layer 41B, the inner end of the layer 42B being brought into abutment with the outer end of layer 41B and the outer end of layer 42A being lapped on top of the inner end of layer 42A by said given length X. The next layer 42B of winding B is then linked on coil 45 over layer 41A, the outer end of layer 42B being brought into abutment with the inner end of layer 41A. It will be noted that in the assembly of the layers the amount of overlap of the lapped layers may be varied some to insure firm abutment with the previously stacked underlying layer. This process of assembly is continued by consecutively stacking the even numbered layers from winding A alternately with the consecutive odd numbered layers from winding B to form core 47. Core 49 is similarly formed by consecutively stacking the odd numbered layers from winding A alternately with the consecutive even numbered layers from winding B.

Thus it will be understood a pair of cores 47, 49 of concentrically stacked lamination layers are formed which include an improved joint means, having in every other layer a lap joint alternated with butt-joint layers and having the butt joints in staggered relationship. It is obvious that the lap joints will have a length of overlap substantially equal to the heretofore designated amount X and the ends of the turns from winding B will be spaced by substantially this same amount X. Thus it is obvious that the length of the sides of the mandrels 13, 25 may be chosen to give the desired length of overlap in the finished cores.

It will be understood that from this method of manufacture magnetic cores are formed which are uniform in cross sectional area, thereby using the strip material to the best advantage and eliminating any undesirable bulky build-up sections in the core. By this arrangement a great savings is realized in the manufacturing cost as compared with previous lap joint cores since in previous cores excess material is needed to form the lap, and yet in this arrangement the advantages of the lap joint in individual continuous lamination layers are maintained.

Although the formation of a pair of cores for one type of transformer has been described, it should be understood that the invention is not limited to a pair of cores for this particular type, but other transformer types may be formed. For example, windings A and B may be combined to form a single core linked with a pair of transformer coils.

Also it will be understood that other details of the method and construction illustrated and described may be altered without departing from the spirit of the invention as defined by the following claims.

I claim:

1. In the method of constructing a transformer comprising the steps of winding magnetic strip material on a first trapezoidal mandrel and winding magnetic strip material on a second trapezoidal mandrel to form a first trapezoidal winding and a second trapezoidal winding, each comprising a plurality of lamination layers, the equal legs of said first trapezoidal winding being formed to have the same length as the equal legs of said second winding, the shorter of the parallel legs of said first winding being equal to the longer of the parallel legs of said second winding, the longer of the parallel legs of each of said windings respectively exceeding the shorter of the legs of each of said windings by the same amount, removing said windings from said mandrels and binding said windings with straps to hold the windings in substantially their wound trapezoidal shape, annealing said winding in said shape to remove the strains and to set the windings in said shape, cutting through the longer parallel leg of said first winding in a plane substantially at the mid point between the equal legs and cutting through the shorter parallel leg of said second winding in a plane substantially at the mid point between the equal legs, removing said straps from the windings, removing alternate lamination layers from the windings in sequence beginning at the inside lamination layers of the windings, building a core linked with one side of the coil of said transformer by concentrically stacking in said sequence the alternate lamination layers removed from the first winding with the alternate lamination layers removed from the second winding, building a second core linked with the other side of the coil of said transformer by stacking in said sequence the remaining lamination layers removed from the first winding alternately with the remaining lamination layers removed from the second winding, concurrently with the stacking of the two cores overlapping the ends of the lamination layers from said first winding and abutting the ends of the lamination layers from said second winding with the ends of the lamination layers of said first winding.

2. In the method of constructing a transformer comprising the steps of winding magnetic strip material on a first trapezoidal mandrel and winding magnetic strip material on a second trapezoidal mandrel to form a first trapezoidal winding and a second trapezoidal winding, each winding comprising a plurality of lamination layers, the equal legs of said first trapezoidal winding being formed to have the same length as the equal legs of said second winding, the shorter of the parallel legs of said first winding being equal in length to the longer of the parallel legs of said second winding, the longer of the parallel legs of each of said windings respectively exceeding the shorter of the legs of each of said windings by the same amount, removing said windings from said mandrels and binding said windings with straps to hold the windings in substantially their wound trapezoidal shape, annealing said windings in said shape to remove the strains and to set the windings in said shape, cutting through the longer parallel leg of said first winding in a plane substantially at the mid point between the equal legs and cutting through the shorter parallel leg of said second winding in a plane substantially at the mid point between the equal legs, removing said straps from the windings, removing alternate lamination layers from the windings in sequence beginning at the inside lamination layers of the windings, building a core linked with the coil of said transformer by concentrically stacking in said sequence the alternate lamination layers removed from the first winding alternately with the alternate lamination layers removed from the second winding, concurrently with the stacking of said core overlapping the ends of the alternate lamination layers from said first winding and abutting the ends of the alternate lamination layers from said second winding with the ends of the alternate lamination layers from said first winding.

3. In a method of constructing a transformer comprising the steps of winding magnetic strip material on a first trapezoidal mandrel and winding magnetic strip material on a second trapezoidal mandrel to form a first trapezoidal winding and a second trapezoidal winding, each winding comprising a plurality of lamination layers, the equal legs of said first trapezoidal winding being formed to have the same length as the equal legs of said second winding, the shorter of the parallel legs of said first winding being equal to the longer of the parallel legs of said second winding, the longer of the parallel legs of each of said windings respectively exceeding the shorter of the legs of each of said windings by the same amount, holding said first winding and said second winding in substantially their wound trapezoidal shape and annealing said windings while being so held to remove the strains and to set the windings in said shape, cutting through the longer parallel side of said first winding in a plane substantially at the mid point between the equal sides and cutting through the shorter parallel side of said second winding in a plane substantially at the mid point between the equal sides, removing the lamination layers from the windings in sequence beginning at the inside layer of the windings, building a core linked with one side of the coil of said transformer by concentrically stacking in said sequence the alternate lamination layers removed from the first winding alternately with the alternate lamination layers removed from the second winding, building a second core linked with the other side of the coil of said transformer by stacking in said sequence the remaining lamination layers removed from the first winding alternately with the remaining lamination layers removed from the second winding, concurrently with the stacking of the two cores overlapping the ends of the lamination layers from said first winding and abutting the ends of the lamination layers of said second winding with the ends of the lamination layers of said first winding.

4. In the method of constructing a transformer comprising the steps of winding magnetic strip material on a first trapezoidal mandrel and winding magnetic strip material on a second trapezoidal mandrel to form a first trapezoidal winding and a second trapezoidal winding, each winding comprising a plurality of lamination layers, the equal legs of said first trapezoidal winding being formed to have the same length as the equal legs of said second winding, the shorter of the parallel legs of said first winding being equal to the longer of the parallel legs of said second winding, the longer of the parallel legs of each of said windings respectively exceeding the shorter of the legs of each of said windings by the same amount, holding said first winding and said second winding in substantially their wound trapezoidal shape and annealing said windings while being so held to remove the strains and to set the windings in said shape, cutting through the longer parallel side of said first winding in a plane substantially at the midpoint of the equal sides and cutting through the shorter parallel side of said second winding in a plane substantially at the midpoint of the equal sides, removing the lamination layers from the windings in sequence beginning at the inside lamination layers of the windings, building a core linked with one side of the coil of said transformer by concentrically stacking in said sequence the alternate lamination layers removed from the first winding alternately with the alternate lamination layers removed from the second winding, building a second core linked with the other side of the coil of said transformer by stacking in said sequence the remaining lamination layers removed from the first winding alternately with the remaining lamination layers removed from the second winding, concurrently with the stacking of the two cores overlapping the ends of the lamination layers from said first winding and abutting the ends of the lamination layers from said second winding with the ends of the lamination layers of said first winding.

5. In the method of constructing a transformer core comprising the steps of winding magnetic strip material on a first trapezoidal mandrel and winding magnetic strip material on a second trapezoidal mandrel to form a first trapezoidal winding and a second trapezoidal winding, each winding comprising a plurality of lamination layers, the equal legs of said first trapezoidal winding being formed to have the same length as the equal legs of said second winding, the shorter of the parallel legs of said first winding being equal to the longer of the parallel legs of said second winding, the longer of the parallel legs of each of said windings respectively exceeding the shorter of the legs of each of said windings by the same amount, holding said first winding and said second winding in substantially their wound trapezoidal shape and annealing said windings while being so held to remove the strains and to set the windings in said shape, cutting through the longer parallel side of said first winding in a plane intermediate the equal sides and cutting through the shorter parallel side of said second winding in a plane intermediate the equal sides, removing alternate lamination layers from the windings and concentrically alternately stacking the lamination layers removed from said first winding with the lamination layers removed from said second winding to form a core having alternate lap and staggered butt joints, said lap joints being formed in the respective individual lamination layers of the said first winding and said core being formed with a substantially uniform cross sectional area.

No references cited.